G. H. CURTISS.
COMBINATION LANDING GEAR FOR AEROPLANES.
APPLICATION FILED MAR. 13, 1918.

1,306,751.

Patented June 17, 1919.

Inventor
GLENN H. CURTISS.

By
Attorney

UNITED STATES PATENT OFFICE.

GLENN H. CURTISS, OF GARDEN CITY, NEW YORK, ASSIGNOR TO CURTISS AEROPLANE AND MOTOR CORPORATION, OF BUFFALO, NEW YORK, A CORPORATION OF NEW YORK.

COMBINATION LANDING-GEAR FOR AEROPLANES.

1,306,751.    Specification of Letters Patent.    Patented June 17, 1919.

Application filed March 13, 1918. Serial No. 222,214.

*To all whom it may concern:*

Be it known that I, GLENN H. CURTISS, a citizen of the United States, residing at Garden City, in the county of Nassau and State of New York, have invented certain new and useful Improvements in Combination Landing-Gears for Aeroplanes, of which the following is a specification.

My invention relates to aeroplanes and is characterized by the construction of the axle fairing in true aerofoil or hydrofoil section. Under existing conditions the axle of the landing gear is at best imperfectly streamlined although fairing is used to advantage and in many machines conjointly as a strut brace. Never, however, in so far as I am aware has it been given a true aerofoil or hydrofoil section that its utility might be materially increased. Heretofore, in land machines, no provision has been made for an enforced landing on water. To so land would upset the machine, damage the landing gear, and in all probability endanger the aviator's life. Hence it is to avoid such a contingency and to construct the axle fairing in lifting rather than non-lifting form that the present invention is designed. Moreover, through an improved construction, provision is made for unrestricted yielding movement of the landing gear axle under normal landing conditions.

Figure 1:
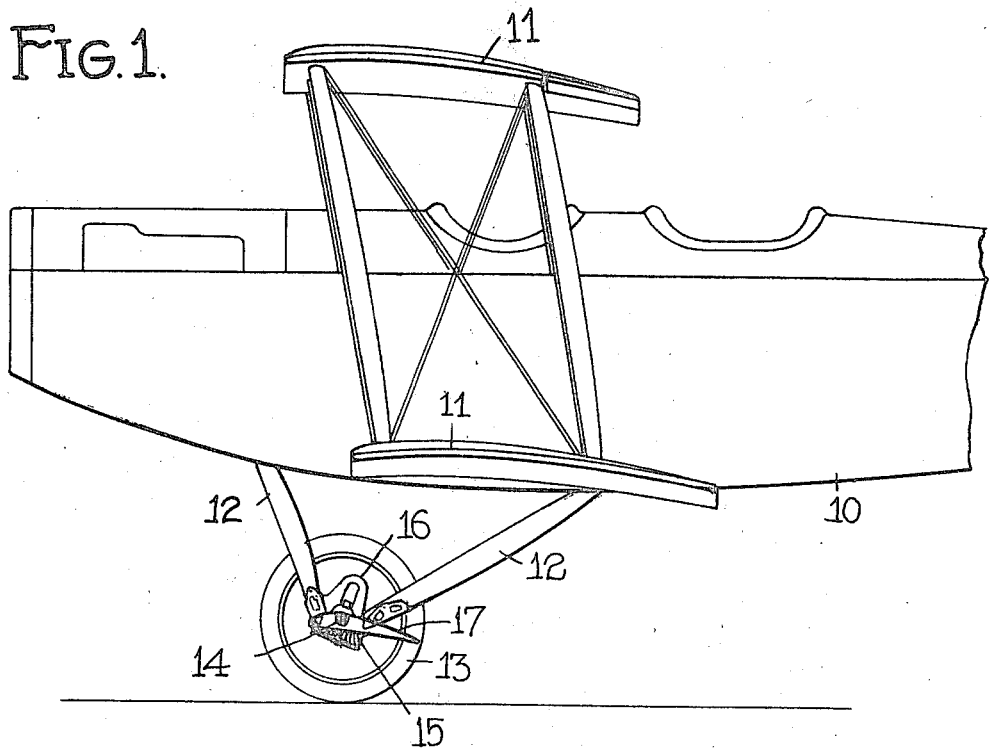
Figure 2:
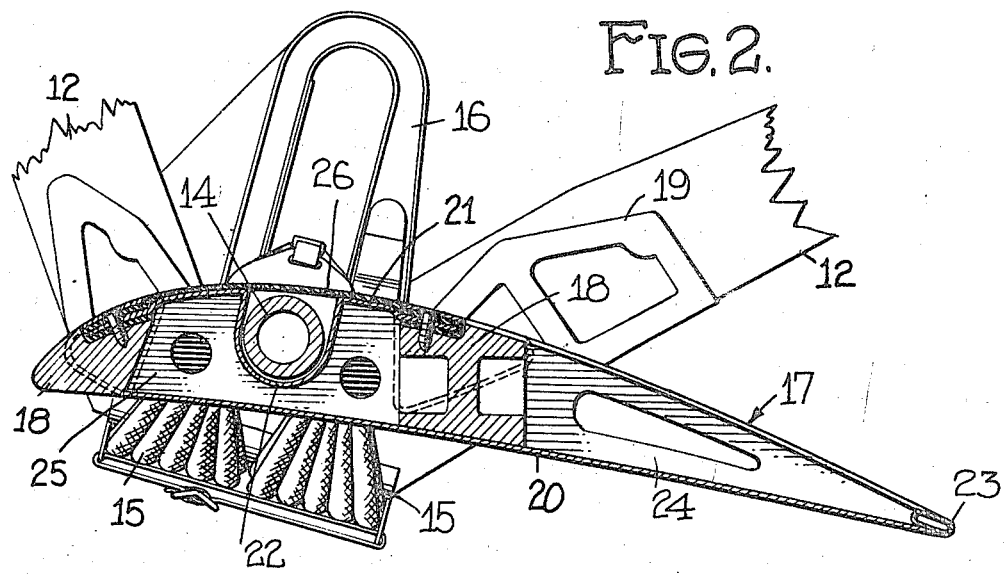

Of the drawings, wherein like characters of reference designate like or corresponding parts:

Figure 1 is a side elevation of a tractor V-strut aeroplane equipped with the improved combined aeroplane and hydroplane surface of this invention, and Fig. 2 is a detail transverse sectional view of said surface.

For purposes of practical illustration the combined aeroplane and hydroplane surface is shown as constituting an element of a standard tractor aeroplane equipped with the conventional V-strut type landing gear. Said surface preferably incloses the landing gear axle and the customary strut braces which ordinarily streamline the axle for decreased head resistance in flight. No limitation, however, in this connection is intended. The combined aeroplane and hydroplane surface may be, if desired, separately supported by and between the landing gear struts either above or below the axle without departing in any way from the generic spirit of the invention as claimed.

The aeroplane illustrated comprises the usual fuselage body 10, principal supporting surfaces 11—11, V-type landing gear struts 12, landing gear wheels 13 and landing gear axle 14. Said axle 14 is normally held against vertical displacement by shock absorber elastics 15 trained beneath the V-struts 12, and at opposite sides of the struts, over the adjacent portions of the axle. Guides 16 for the axle 14 are provided.

The improved auxiliary supporting surface 17 is of true aerofoil and hydrofoil section. As shown, it is arranged to completely inclose the axle 14 of the landing gear. Its construction is such that the usual axle fairing may be dispensed with, or, from a different point of view, the axle fairing may be described as constructed in aerofoil or hydrofoil form. Considered from either angle, under the conditions stated, the result is exactly the same.

Strut braces 18, in the form of lightened beams support the surface 17. Said beams 18 are terminally shaped to engage in sockets formed as an integral part of the V-strut fittings characteristic of a standard Curtiss machine. The beams are located respectively fore and aft of the axle with the beam in advance of the axle constituting a leading edge strip for said surface 17 by reason of its cross sectional form.

That a true aerofoil section may be given the surface 17 the beams 18 are interconnected in planes above and below the axle by sheet metal strips or sheathing. These metal strips, designated respectively 20 and 21, marginally overlap the beams 18 to provide a securing surface and with said beam afford a water tight compartment. The upper or top strip 21 is pocketed or offset longitudinally intermediate its longitudinal edges as at 22. Within the pocket thus formed the axle 14 is normally inclosed and hidden. Aft of the rear beam 18 the surface framework comprises a metallic trailing edge strip 23 and lightened ribs 24 interconnecting said strip 23 and said beam. Fabric covering, except in the vicinity of the pocket 22, may or may not be used. Also, if desired, the beams 18 may be interbraced by lightened transversely extending ribs 25.

Under normal conditions the elastics 15 are in repose, that is, unstretched. Being unstretched, the axle 14 normally lies hidden within the pocket 22 of the aerofoil 17. Vertical displacement of the axle, however, occurs when landing and preliminary to aerial flight. For this reason the guides 16 are provided. Accordingly that side of the surface beyond which the axle moves when displaced is left uncovered except for an elastic strip 26 stretched over said pocket. This strip maintains the true aerofoil section between beams so long as the axle remains unmoved. In addition the strip also prevents the entrance of water into the pocket 22.

By giving to the surface 17 an angle of incidence somewhat greater than the angle of incidence of the principal supporting surfaces 11 a hydroplane surface of considerable effective area is produced. A surface of this type situated at the base of the landing gear renders landing upon the surface of the water of a land machine practicable and entirely feasible without endangering either the pilot or the machine. The area of the surface is such that upon an enforced landing upon water the hydroplaning action is sufficient to support the weight of the machine by reason of its moving speed. As the speed of the craft gradually lessens the hydroplane surface settles deeper until finally the body of the machine comes into engagement with the water surface. This gradual diminution of the moving speed is conducive to safe landing and eliminates completely the nosing under tendency which would otherwise exist. In aerial flight the increased angle of incidence given the surface 17 is such that slight aerodynamic lift is obtained, i. e., lift at least sufficient to sustain the weight of the surface and, depending upon the distance between struts and the depth of the chord, a portion of the weight of the entire machine. The beams 18 effectually interbrace the landing gear struts and consequently replace the axle fairing heretofore used. If desired, the lightened surface 17 disclosed, may be in the nature of fairing construction in aerofoil or hydrofoil section. The location of the auxiliary surface in the plane of the axle 14 is deemed best by reason of the decreased head resistance obtained. Furthermore, it is believed to be essentially novel to mount a supporting surface, especially one serving a twofold purpose by and between the landing gear struts of a land machine.

What is claimed is:

1. In an airplane, the combination of a landing gear including ground runners adapting the machine to arise from and alight upon the ground, a cross connection between the runners, a principal aerial supporting surface adapting the machine to aerial flight, and a cambered auxiliary supporting surface carried by the landing gear and streamlining the cross connection between the ground runners, the cross sectional form of said aerial auxiliary supporting surface being such that the machine is adapted to alight upon the water should occasion demand.

2. In an airplane, the combination of a wheeled landing gear adapting the machine to arise from and alight upon the ground, a cross connection between the wheels of the landing gear, and a hydroplaning surface adapting the machine to alight upon the water, the cross sectional form of the hydroplaning surface being such that the cross connection is inclosed for the major part within its confines.

3. In an airplane, the combination of a landing gear including ground runners adapting the machine to arise from and alight upon the ground, a principal supporting surface for sustaining the machine in flight through the air, a cross-connection between the runners of the landing gear, and a hydroplaning surface adapting the machine to alight upon the water, the cross sectional form of the hydroplaning surface being such that it constitutes an auxiliary supporting surface and at the same time offers a streamline inclosure within which the cross connection between the runners of the landing gear is confined.

4. In an airplane, the combination of a wheeled landing gear adapting the machine to arise from and alight upon the ground, an axle upon which the wheels of the landing gear are mounted, means yieldingly resisting vertical displacement of the axle, and a hydroplaning surface inclosing the axle and adapting the machine to alight upon the water, the cross sectional form of the hydroplaning surface being such that it constitutes an auxiliary supporting surface while the machine is supported wholly by the reaction of air upon its wings or supporting surfaces.

In testimony whereof I hereunto affix my signature.

GLENN H. CURTISS.